United States Patent Office 3,828,065
Patented Aug. 6, 1974

3,828,065
2-METHYL-5-NITRO-1-(2-PHENYLTHIOETHYL) IMIDAZOLES
Eunice M. Kreider, Chicago, Ill., assignor to
G. D. Searle & Co., Chicago, Ill.
No Drawing. Filed Dec. 11, 1972, Ser. No. 314,132
Int. Cl. C07d 49/36
U.S. Cl. 260—309      10 Claims

ABSTRACT OF THE DISCLOSURE

The present invention is concerned with 2-methyl-5-nitro-1-(2-phenylthioethyl)imidazoles. These compounds are prepared by the condensation of substituted thiophenols with 1-(2-chloroethyl)-5-nitro-2-methylimidazole in the presence of base in a polar solvent. The compounds of this invention are anti-protozoal agents.

The present invention is related to compounds of the formula

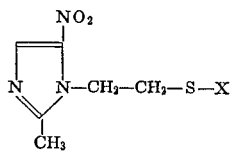

wherein X is an optionally substituted phenyl radical, the substituents being lower alkyl, lower alkoxy, halo or nitro groups.

The lower alkyl and lower alkoxy moiety of the (lower alkyl)phenyl and (lower alkoxy)phenyl radicals contain from 1 to 7 carbon atoms.

These compounds are prepared by the reaction of substituted thiophenols with 1-(2-chloroethyl)-5-nitro-2-methylimidazole in the presence of base in a polar solvent. Dimethylformamide and dimethylsulfoxide are suitable solvents and sodium or potassium hydroxide are suitable bases. Thus, p-chlorothiophenol is condensed with 1-(2-chloroethyl)-5-nitro-2-methylimidazole in the presence of potassium hydroxide in dimethylformamide to form 1-[2-(p-chlorophenylthio)ethyl]-5-nitro-2-methylimidazole.

Also encompassed by the present invention are salts of the above compounds. Thus, the compounds indicated above form non-toxic salts with a variety of inorganic and strong organic acids. That is, they form salts with sulfuric, phosphoric, hydrochloric, hydrobromic, sulfamic, citric, lactic, maleic, malic, succinic, tartaric, cinnamc, acetic, benzoic, gluconic, oxalic, and related acids.

The compounds of the present invention are useful in view of their anti-microbial activity. They are especially effective in inhibiting the growth of protozoa.

Evidence of the ani-protozoal utility of the present compounds is obtained from standardized tests designed to determine the capacity of test compounds to inhibit the growth Trichomonas vaginalis. These tests are carried out in the following manner. A modified Diamond medium is prepared by mixing 1200 parts of trypticase (Baltimore Biological Laboratories), 600 parts of yeast extract (Difco), 300 parts of maltose, 60 parts of L-cysteine hydrochloride, 12 parts of L-ascorbic acid, 48 parts of dibasic potassium phosphate, 48 parts of monobasic potassium phosphate and 54,000 parts of distilled water. The pH is adjusted to 6.8 with 40% sodium hydroxide solution and 30 parts of agar (Baltimore Biological Laboratories) is incorporated. The mixture is boiled for one minute to dissolve the agar and is then sterilized in an autoclave. To 80 volumes of the resultant medium is aseptically added 20 volumes of sterile Dubos medium serum. The resultant medium is inoculated with 1% by volume of a 72 hour culture of Trichomonas vaginalis, whereupon 1 ml. of the inoculated medium is mixed with 10 mg. of test compound. The mixture is incubated anaerobically at 37° C. for 48 hours and then examined microscopically for the presence of motile trichomonads. If any are observed the compound is considered inactive. If no motile trichomonads are observed, 0.1 ml. of the incubated mixture is serially diluted and mixed with quantities of the inoculated medium sufficient to produce concentrations of 1000, 100, 10 and 1 micrograms of test compound per ml. and the resulting mixtures are incubated anaerobically as before at 37° C. for 48 hours and then examined microscopically for the presence of motile trichomonads. Controls are provided by concurrent incubations identical with the foregoing except for the absence of test compound.

The following examples are presented to further illustrate the present invention. They should not be construed as limiting it either in spirit or in scope. In these examples quantities are indicated in parts by weight unless parts by volume are specified, and temperatures are indicated in degrees centigrade (° C.). The relationship between parts by weight and parts by volume is the same as that existing between grams and milliliters.

EXAMPLE 1

3.0 Parts of p-chlorothiophenol and 5.2 parts by volume of 4 N potassium hydroxide are diluted with 25 parts by volume of dimethylformamide and this solution is stirred during the addition of a solution of 3.93 parts of 1-(2-chloroethyl)-5-nitro-2-methylimidazole in 25 parts by volume of dimethylformamide. The resulting solution is heated for three hours, cooled, diluted with 100 parts by volume of water, and extracted with chloroform. The chloroform extracts are washed successively with water and dilute sodium hydroxide solution and dried. The solvent is removed by evaporation at reduced pressure and the residue is dissolved in 1:1 chloroform-hexane and filtered through alumina. The filtrate is decolorized by treatment with decolorizing charcoal and cooled. The resulting precipitate is 1-[2-(p-chlorophenylthio)ethyl]-5-nitro-2-methylimidazole, melting at 111–112°. The formula is

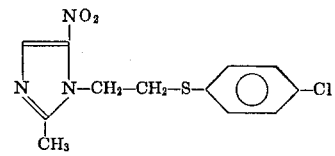

EXAMPLE 2

3.73 Parts of 4-toluenethiol and 7.5 parts by volume of 4 N potassium hydroxide are diluted with 25 parts by volume of dimethylformamide and this solution is stirred during the addition of a solution of 5.67 parts of 1-(2-chloroethyl)-5-nitro-2-methylimidazole in 25 parts by volume of dimethylformamide. The resulting solution is heated for three hours, cooled, diluted with 100 parts by volume of water, and extracted with chloroform. The chloroform extracts are washed successively with water and dilute sodium hydroxide solution and dried. The solvent is removed by evaporation at reduced pressure and the residue is dissolved in 1:1 chloroform-hexane and filtered through alumina. The filtrate is decolorized by treatment with decolorizing charcoal and cooled. The resulting precipitate is 1-[2-(p-methylphenylthio)ethyl]-5-nitro-2-methylimidazole, melting at 121–122°. The formula is

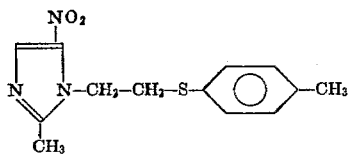

EXAMPLE 3

3.45 Parts of p-t-butylthiophenol and 5.2 parts by volume of 4 N potassium hydroxide are diluted with 25 parts by volume of dimethylformamide and this solution is stirred during the addition of a solution of 3.93 parts of 1-(2-chloroethyl)-5-nitro-2-methylimidazole in 25 parts by volume of dimethylformamide. The resulting solution is heated for three hours, cooled, diluted with 100 parts by volume of water, and extracted with chloroform. The chloroform extracts are washed successively with water and dilute sodium hydroxide solution and dried. The solvent is removed by evaporation at reduced pressure and the residue is dissolved in 1:1 chloroform-hexane and filtered through alumina. The filtrate is decolorized by treatment with decolorizing charcoal and cooled. The resulting precipitate is 1-[2-(p-t-butylphenylthio)ethyl]-5-nitro-2-methylimidazole melting at 95.5–97°. The formula is

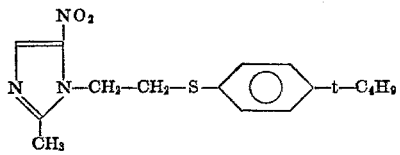

EXAMPLE 4

2.76 Parts of benzenethiol and 6.5 parts by volume of 4 N potassium hydroxide are diluted with 25 parts by volume of dimethylformamide and this solution is stirred during the addition of a solution of 4.72 parts of 1-(2-chloroethyl)-5-nitro-2-methylimidazole in 25 parts by volume of dimethylformamide. The resulting solution is heated for three hours, cooled, diluted with 100 parts by volume of water, and extracted with chloroform. The chloroform extracts are washed successively with water and dilute sodium hydroxide solution and dried. The solvent is removed by evaporation at reduced pressure and the residue is dissolved in 1:1 chloroform-hexane and filtered through alumina. The filtrate is decolorized by treatment with decolorizing charcoal and cooled. The resulting precipitate is 1-(2-phenylthioethyl)-5-nitro-2-methylimidazole, melting at 77–78°. The formula is

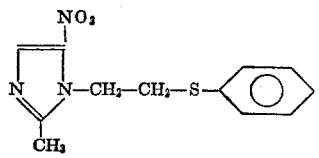

EXAMPLE 5

3.85 Parts of p-fluorothiophenol and 7.5 parts by volume of 4 N potassium hydroxide are diluted with 25 parts by volume of dimethylformamide and this solution is stirred during the addition of a solution of 5.67 parts of 1-(2-chloroethyl)-5-nitro-2-methylimidazole in 25 parts by volume of dimethylformamide. The resulting solution is heated for three hours, cooled, diluted with 100 parts by volume of water, and extracted with chloroform. The chloroform extracts are washed successively with water and dilute sodium hydroxide solution and dried. The solvent is removed by evaporation at reduced pressure and the residue is dissolved in 1:1 chloroform-hexane and filtered through alumina. The filtrate is decolorized by treatment with decolorizing charcoal and cooled. The resulting precipitate is 1-[2-(p-fluorophenylthio)ethyl]-5-nitro-2-methylimidazole. The formula is

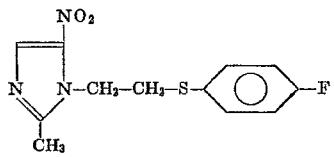

EXAMPLE 6

7.08 parts of p-iodothiophenol and 7.5 parts by volume of 4 N potassium hydroxide are diluted with 25 parts by volume of dimethylformamide and this solution is stirred during the addition of a solution of 5.67 parts of 1-(2-chloroethyl)-5-nitro-2-methylimidazole in 25 parts by volume of dimethylformamide. The resulting solution is heated for three hours, cooled, diluted with 100 parts by volume of water, and extracted with chloroform. The chloroform extracts are washed successively with water and dilute sodium hydroxide solution and dried. The solvent is removed by evaporation at reduced pressure and the residue is dissolved in 1:1 chloroform-hexane and filtered through alumina. The filtrate is decolorized by treatment with decolorizing charcoal and cooled. The resulting precipitate is 1-[2-(p-iodophenylthio)ethyl]-5-nitro-2-methylimidazole. The formula is

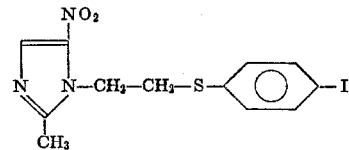

EXAMPLE 7

4.63 Parts of p-ethoxythiophenol and 7.5 parts by volume of 4 N potassium hydroxide are diluted with 25 parts by volume of dimethylformamide and this solution is stirred during the addition of a solution of 5.67 parts of 1-(2-chloroethyl)-5-nitro-2-methylimidazole in 25 parts by volume of dimethylformamide. The resulting solution is heated for three hours, cooled, diluted with 100 parts by volume of water, and extracted with chloroform. The chloroform extracts are washed successively with water and dilute sodium hydroxide solution and dried. The solvent is removed by evaporation at reduced pressure and the residue is dissolved in 1:1 chloroform-hexane and filtered through alumina. The filtrate is decolorized by treatment with decolorizing charcoal and cooled. The resulting precipitate is 1-[2-(p-ethoxyphenylthio)ethyl]-5-nitro-2-methylimidazole. The formula is

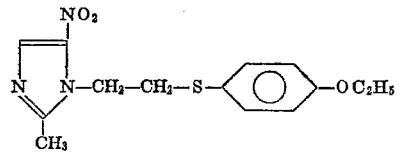

EXAMPLE 8

5.35 Parts of p-nitrothiophenol and 9.0 parts by volume of 4 N potassium hydroxide are diluted with 30 parts by volume of dimethylformamide and this solution is stirred during the addition of a solution of 6.60 parts of 1-(2-chloroethyl)-5-nitro-2-methylimidazole in 30 parts by volume of dimethylformamide. The resulting solution is heated for three hours, cooled, diluted with 100 parts by volume of water, and extracted with chloroform. The chloroform extracts are washed successively with water and dilute sodium hydroxide solution and dried. The solvent is removed by evaporation at reduced pressure to provide a yellow solid. This solid is chromatographed on alumina. Elution with 5% ethyl acetate-benzene gave a solid which is recrystallized from methanol-dimethylformamide-hexane. Treatment with decolorizing charcoal and crystallization provides 1-[2-(p-nitrophenylthio)ethyl]-5-nitro-2-methylimidazole, melting at 130.5–131.5°. The formula is

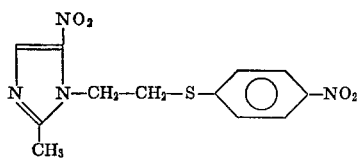

EXAMPLE 9

3.73 Parts of m-toluenethiol and 7.5 parts by volume of 4 N potassium hydroxide are diluted with 25 parts by volume of dimethylformamide and this solution is stirred during the addition of a solution of 5.67 parts of 1-(2-chloroethyl)-5-nitro-2-methylimidazole in 25 parts by volume of dimethylformamide. The resulting solution is heated for three hours, cooled, diluted with 100 parts by volume of water, and extracted with chloroform. The chloroform extracts are washed successively with water and dilute sodium hydroxide solution and dried. The solvent is removed by evaporation at reduced pressure and the residue is dissolved in 1:1 chloroform-hexane and filtered through alumina. The filtrate is decolorized by treatment with decolorizing charcoal and cooled. The resulting precipitate is 1-[2-(m-methylphenylthio)ethyl]-5-nitro-2-methylimidazole, melting at 90–92.5°. The formula is

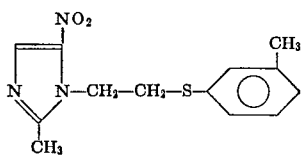

Acidification of a methanol solution of this derivative with oxalic acid followed by precipitation and recrystallization in methanol-ether provides the hemi-oxalate, melting at 85–89°. The formula of the salt is

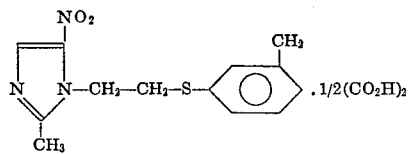

EXAMPLE 10

4.73 Parts of o-bromothiophenol and 6.5 parts by volume of 4 N potassium hydroxide are diluted with 25 parts by volume of dimethylformamide and this solution is stirred during the addition of a solution of 4.73 parts of 1 - (2 - chloroethyl)-5-nitro-2-methylimidazole in 25 parts by volume of dimethylformamide. The resulting solution is heated for three hours, cooled, diluted with 100 parts by volume of water, and extracted with chloroform. The chloroform extracts are washed successively with water and dilute sodium hydroxide solution and dried. The solvent is removed by evaporation at reduced pressure and the residue is dissolved in 1:1 chloroform-hexane and filtered through alumina. The filtrate is decolorized by treatment with decolorizing charcoal and cooled. The resulting liquid is 1 - [2-(o-bromophenylthio)ethyl-5-nitro-2-methylimidazole. The formula is

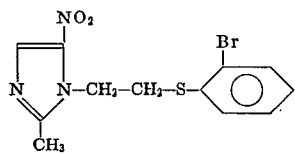

Acidification of a methanol solution of this derivative with oxalic acid followed by precipitation and recrystallization in methanol-ether provides the hemi-oxalate, melting at 133–134°. The formula of the salt is

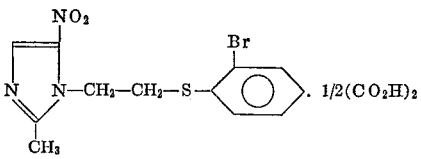

EXAMPLE 11

9.90 Parts of pentachlorothiophenol and 8.75 parts by volume of 4 N potassium hydroxide are diluted with 25 parts by volume of dimethylformamide and this solution is stirred during the addition of a solution of 6.60 parts of 1 - (2-chloroethyl)-5-nitro-2-methylimidazole in 25 parts by volume of dimethylformamide. The product precipitates as the solution is heated. The precipitate is filtered, washed with water, and recrystallized from warm chloroform and hexane. Treatment with decolorizing charcoal and recrystallization provides 1-[2-(pentachlorophenylthio)ethyl] - 5-nitro-2-methylimidazole, melting at 179–180°. The formula is

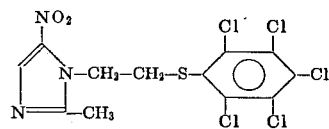

EXAMPLE 12

6.1 Parts of 4-bromo-m-thiocresol and 7.5 parts by volume of 4 N potassium hydroxide are diluted with 25 parts by volume of dimethylformamide and this solution is stirred during the addition of a solution of 5.67 parts of 1 - (2 - chloroethyl)-5-nitro-2-methylimidazole in 25 parts by volume of dimethylformamide. The resulting solution is heated for three hours, cooled, diluted with 100 parts by volume of water, and extracted with chloroform. The chloroform extracts are washed successively with water and dilute sodium hydroxide solution and dried. The solvent is removed by evaporation at reduced pressure and the residue is dissolved in 1:1 chloroform-hexane and filtered through alumina. The filtrate is concentrated and then taken-up in methanol. The methanol solution is acidified with 6.5 N hydrogen chloride in isopropanol and the addition of ether causes precipitation of the product, 1-[2-(4-bromo-3-methylphenylthio)ethyl]-5-nitro-2-methylimidazole hydrocholride, melting at 174–177°.

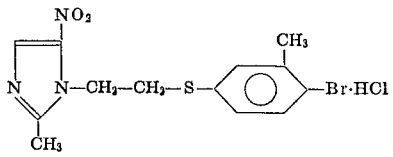

EXAMPLE 13

4.63 Parts of p-methoxythiophenol and 7.5 parts by volume of 4 N potassium hydroxide are diluted with 25 parts by volume of dimethylformamide and this solution is stirred during the addition of a solution of 5.67 parts of 1 - (2-chloroethyl)-5-nitro-2-methylimidazole in 25 parts by volume of dimethylformamide. The resulting solution is heated for three hours, cooled, diluted with 100 parts by volume of water, and extracted with chloroform. The chloroform extracts are washed successively with water and dilute sodium hydroxide solution and dried. The solvent is removed by evaporation at reduced pressure and the residue is dissolved in 1:1 chloroform-hexane and filtered through alumina. The filtrate is decolorized by treatment with decolorizing charcoal and cooled. The resulting precipitate is 1 - [2-(p-methoxyphenylthio)ethyl] - 5-nitro-2-methylimidazole. The formula is

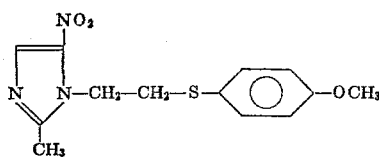

What is claimed is:
1. A compound of the formula

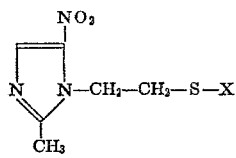

wherein X is 4-bromo-3-methylphenyl, pentachlorophenyl, or substituted phenyl of the formula

Y being lower alkyl, lower alkoxy, halo, or nitro.

2. As in claim 1, the compound which is 1-[2-(p-chlorophenylthio)ethyl]-5-nitro-2-methylimidazole.
3. As in claim 1, the compound which is 1-[2-(p-methylphenylthio)ethyl]5-nitro-2-methylimidazole.
4. As in claim 1, the compound which is 1-[2-(p-t-butylphenylthio)ethyl]-5-nitro-2-methylimidazole.
5. As in claim 1, the compound which is 1-[2-(p-fluorophenylthio)ethyl]-5-nitro-2-methylimidazole.
6. As in claim 1, the compound which is 1-[2-(p-nitrophenylthio)ethyl]-5-nitro-2-methylimidazole.
7. As in claim 1, the compound which is 1-[2-(m-methylphenylthio)ethyl]-5-nitro-2-methylimidazole.
8. As in claim 1, the compound which is 1-[2-(o-bromophenylthio)ethyl]-5-nitro-2-methylimidazole.
9. As in claim 1, the compound which is 1-[2-(4-bromo-3-methylphenylthio)ethyl]-5-nitro-2-methylimidazole.
10. As in claim 1, the comopund which is 1-[2-(pentachlorophenylthio)ethyl]-5-nitro-2-methylimidazole.

References Cited
UNITED STATES PATENTS
| | | | |
|---|---|---|---|
| 3,376,311 | 4/1968 | Butler | 260—309 |
| 3,689,502 | 9/1972 | Scollick et al. | 260—309 |

FOREIGN PATENTS
| | | | |
|---|---|---|---|
| 5,567 | 11/1967 | France | 260—309 |
| 1,153,347 | 5/1969 | Great Britain | 260—309 |

OTHER REFERENCES
Kajfez et al., J. Med Chem., Vol. 11, pp. 167–9 (1968).
Cosar et al., Arzneimittel-Forschung, Vol. 16, pp. 23–9 (1966).
Conant et al., The Chemistry of Organic Compounds 3rd ed. page 342 N.Y., MacMillan, 1947.

NATALIE TROUSOF, Primary Examiner

U.S. Cl. X.R.
424—273